US008636473B2

(12) United States Patent
Brunken, Jr.

(10) Patent No.: US 8,636,473 B2
(45) Date of Patent: Jan. 28, 2014

(54) DIFFERENTIAL PITCH CONTROL TO OPTIMIZE CO-ROTATING STACKED ROTOR PERFORMANCE

(71) Applicant: Bell Helicopter Textron Inc., Fort Worth, TX (US)

(72) Inventor: John E. Brunken, Jr., Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/933,303

(22) Filed: Jul. 2, 2013

(65) Prior Publication Data

US 2013/0294912 A1 Nov. 7, 2013

Related U.S. Application Data

(62) Division of application No. 13/321,312, filed as application No. PCT/US2009/044895 on May 21, 2009, now Pat. No. 8,496,434.

(51) Int. Cl.
*B64C 11/00* (2006.01)

(52) U.S. Cl.
USPC .............................. 416/114; 244/6; 244/17.23

(58) Field of Classification Search
USPC ............. 244/6, 7 C, 7 R, 17.23, 17.11, 17.25, 244/17.27; 416/124, 113, 120
See application file for complete search history.

(56) References Cited

U.S. PATENT DOCUMENTS

| | | | | |
|---|---|---|---|---|
| 2,481,750 A | * | 9/1949 | Hiller, Jr. et al. | 416/115 |
| 2,969,117 A | * | 1/1961 | Schon | 416/114 |
| 3,002,711 A | * | 10/1961 | Stefano | 244/17.23 |
| 3,035,789 A | * | 5/1962 | Young | 244/7 C |
| 3,592,412 A | * | 7/1971 | Glatfelter | 244/7 A |
| 3,684,398 A | * | 8/1972 | Davidson et al. | 416/155 |
| 3,784,319 A | * | 1/1974 | Amer et al. | 416/135 |
| 3,905,665 A | | 9/1975 | Kolwey | |
| 4,589,611 A | * | 5/1986 | Ramme et al. | 244/6 |

(Continued)

FOREIGN PATENT DOCUMENTS

| | | |
|---|---|---|
| CH | 677844 A5 | 6/1991 |
| EP | 2432690 A | 3/2012 |

(Continued)

OTHER PUBLICATIONS

International Preliminary Report on Patentability of the International Preliminary Examining Authority mailed by IPEA/USA, U.S. Patent and Trademark Office on Dec. 12, 2011 for International Patent Application No. PCT/US09/44895, 6 pages.

(Continued)

*Primary Examiner* — Christopher P Ellis
*Assistant Examiner* — Medhat Badawi
(74) *Attorney, Agent, or Firm* — James E. Walton

(57) ABSTRACT

A rotor system for a rotorcraft having at least one rotor blade pair operably associated with a differential pitch assembly operably for controlling a pitch angle of an upper rotor blade and the lower rotor blade in the rotor blade pair. Operation of the differential pitch assembly changes the pitch of the upper rotor blade more severely than the pitch of the lower rotor blade. As such, the rotor system is configured to provide optimum pitch of the upper and lower rotor blades during a helicopter mode and an airplane mode.

8 Claims, 6 Drawing Sheets

(56) References Cited

U.S. PATENT DOCUMENTS

| | | | | |
|---|---|---|---|---|
| 4,881,874 | A * | 11/1989 | White et al. | 416/138 |
| 5,066,195 | A * | 11/1991 | Dobrzynski | 416/200 R |
| 5,096,383 | A * | 3/1992 | Dobrzynski | 416/200 R |
| 5,190,242 | A * | 3/1993 | Nichols | 244/12.2 |
| 5,381,985 | A * | 1/1995 | Wechsler et al. | 244/7 C |
| 5,507,453 | A * | 4/1996 | Shapery | 244/12.5 |
| 6,099,254 | A * | 8/2000 | Blaas et al. | 416/114 |
| 6,220,545 | B1 * | 4/2001 | Fenny et al. | 244/7 R |
| 6,231,005 | B1 * | 5/2001 | Costes | 244/17.25 |
| 6,415,206 | B1 * | 7/2002 | Ventres | 700/280 |
| 6,450,446 | B1 * | 9/2002 | Holben | 244/34 A |
| 6,454,206 | B2 * | 9/2002 | Vincent | 244/17.27 |
| 6,467,723 | B1 * | 10/2002 | Rossetti et al. | 244/17.11 |
| 6,574,572 | B2 * | 6/2003 | Bechhoefer | 702/56 |
| 6,616,095 | B2 * | 9/2003 | Stamps et al. | 244/17.13 |
| 6,695,106 | B2 * | 2/2004 | Smith et al. | 188/378 |
| 7,083,142 | B2 * | 8/2006 | Scott | 244/17.13 |
| 7,118,328 | B2 * | 10/2006 | Welsh et al. | 416/170 R |
| 7,143,973 | B2 * | 12/2006 | Ballew | 244/6 |
| 7,210,651 | B2 * | 5/2007 | Scott | 244/17.13 |
| 7,264,199 | B2 * | 9/2007 | Zientek | 244/17.11 |
| 7,648,338 | B1 * | 1/2010 | Welsh | 416/1 |
| 7,789,341 | B2 * | 9/2010 | Arlton et al. | 244/17.23 |
| 7,871,033 | B2 * | 1/2011 | Karem et al. | 244/7 A |
| 8,033,498 | B2 * | 10/2011 | Blackburn | 244/17.23 |
| 8,287,237 | B2 * | 10/2012 | Stamps et al. | 416/102 |
| 8,322,648 | B2 * | 12/2012 | Kroetsch et al. | 244/17.23 |
| 8,328,128 | B2 * | 12/2012 | Wiggerich | 244/17.23 |
| 2005/0067527 | A1 | 3/2005 | Petersen | |
| 2006/0011777 | A1 * | 1/2006 | Arlton et al. | 244/7 B |
| 2007/0158494 | A1 | 7/2007 | Burrage | |
| 2007/0181742 | A1 * | 8/2007 | Van de Rostyne et al. | 244/17.23 |

FOREIGN PATENT DOCUMENTS

| | | |
|---|---|---|
| FR | 1316302 A | 1/1963 |
| GB | 2409845 A | 7/2005 |
| WO | 2010134920 A1 | 11/2010 |
| WO | 2010143921 A1 | 11/2010 |

OTHER PUBLICATIONS

Extended European Search Report mailed from the European Patent Office Mar. 21, 2012 from related European Patent Application No. 09845032.3-1254, 5 pages.

International Preliminary Report on Patentability of the International Preliminary Examining Authority mailed by IPEA/USA, U.S. Patent and Trademark Office on Jul. 13, 2012 for related International Patent Application No. PCT/US09/44955, 7 pages.

Extended European Search Report from related Application 09845035.6-2422 issued by the European Patent Office dated Apr. 18, 2012.

International Search Report and the Written Opinion of the International Searching Authority mailed by ISA/USA, U.S. Patent and Trademark Office on Jul. 14, 2009 for related International Patent Application No. PCT/US09/44963, 9 pages.

International Preliminary Examination Report mailed by IPEA/USA, U.S. Patent and Trademark Office on Oct. 11, 2011 for related International Patent Application No. PCT/US09/44963, 8 pages.

International Search Report and the Written Opinion of the International Searching Authority mailed by ISA/USA, U.S. Patent and Trademark Office on Jul. 14, 2009 for related International Patent Application No. PCT/US09/44895, 8 pages.

International Search Report and the Written Opinion of the International Searching Authority mailed by ISA/USA, U.S. Patent and Trademark Office on Nov. 13, 2009 for related International Patent Application No. PCT/US09/44955, 7 pages.

Extended European Search Report from European Patent Office in related European Patent Application No. 09845034, mailed Sep. 14, 2012, 6 pages.

Examination Report from European Patent Office in related European Patent Application No. 09845035, mailed Nov. 27, 2012, 6 pages.

* cited by examiner

DIFFERENTIAL PITCH CONTROL TO OPTIMIZE CO-ROTATING STACKED ROTOR PERFORMANCE

BACKGROUND

1. Field of the Invention

The present application relates in general to the field of rotor systems for rotorcraft.

2. Description of Related Art

There are many different types of rotorcraft, including helicopters, tandem rotor helicopters, tiltrotor aircraft, four-rotor tiltrotor aircraft, tilt wing aircraft, and tail sitter aircraft. In all of these rotorcraft, thrust and/or lift is generated by air flowing through a rotor disk formed by a plurality of rotating rotor blades. The plurality of rotor blades are mechanically coupled with and substantially evenly spaced about a rotatable mast, which provides rotational motion to the plurality of rotor blades. Each of the plurality of rotor blades is independently rotatable to affect a pitch of the blade. Varying the pitch of the plurality of blades affects lift and the direction of thrust produced by the rotating plurality of blades.

FIG. 1 depicts a military tiltrotor aircraft 101 with conventional rotor hubs 107a and 107b. Rotor hubs 107a and 107b are mechanically coupled to nacelles 103a and 103b, respectively. Nacelles 103a and 103b are rotably attached to wing members 105a and 105b, respectively. Wing members 105a and 105b are rigidly fixed to fuselage 109. Rotor hubs 107a and 107b have a plurality of rotor blades 111a and 111b, respectively. The tiltrotor aircraft 101 of FIG. 1 is depicted in helicopter mode, with nacelles 103a and 103b directed up.

FIG. 2 depicts a commercial tiltrotor aircraft 201 with conventional rotor hubs 207a and 207b. Rotor hubs 207a and 207b are mechanically coupled to nacelles 203a and 203b, respectively. Nacelles 203a and 203b are rotably attached to wing members 205a and 205b, respectively. Wing members 205a and 205b are rigidly fixed to fuselage 209. Rotor hubs 207a and 207b have a plurality of rotor blades 211a and 211b, respectively. FIG. 2 depicts tiltrotor aircraft 201 in airplane mode, with nacelles 203a and 203b directed forward.

It is often desirable to utilize a multiple rotor disks in a stacked configuration, the multiple rotor disks rotating about the same axis of rotation, to increase the lift and/or thrust of a rotorcraft. In operation, each rotor disk may experience a different aerodynamic condition, depending on variables such as forward speed and orientation of the rotor hub. There is a need for rotor system which can variably adjust the pitch of the rotor blades of each rotor disk in a simple and efficient means.

There are many rotorcraft rotor systems well known in the art; however, considerable room for improvement remains.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
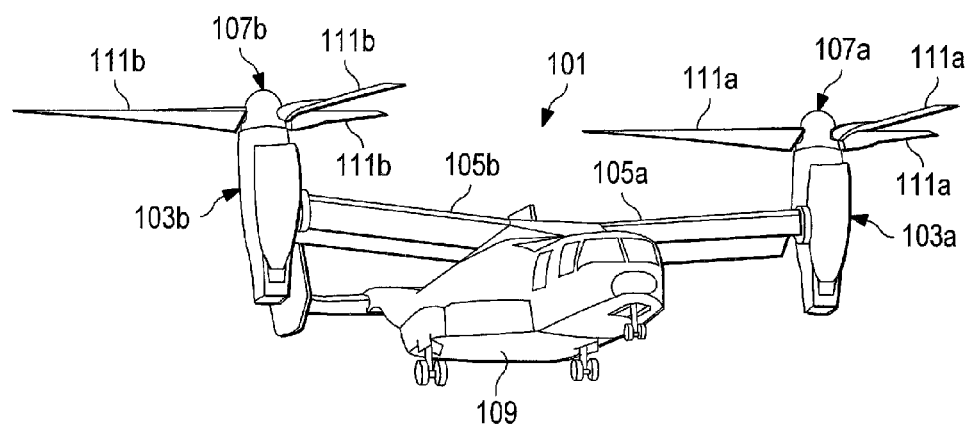
FIG. 1 is a perspective view of a prior art tiltrotor aircraft in helicopter mode.
Figure 2:
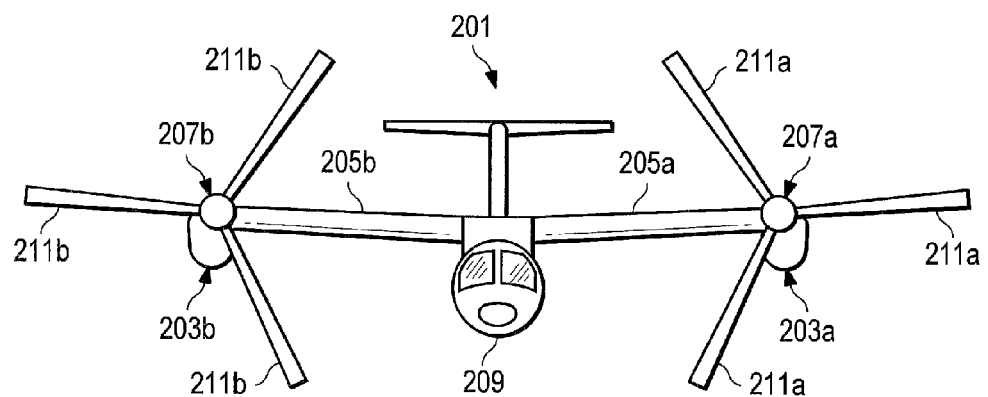
FIG. 2 is a front view of the prior art tiltrotor aircraft of FIG. 1, in airplane mode.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present application represents a rotor system for a rotorcraft and a rotorcraft incorporating the rotor system. The rotor system includes a rotor hub having a plurality of rotor blade pairs. A differential pitch link assembly is mechanically coupled to each rotor blade pair, for variably controlling a pitch angle of each rotor blade in the rotor blade pair, in tandem. Actuation of swashplate link provides an input to the differential pitch link assembly, thereby changing the pitch of each rotor blade in the rotor blade pair associated with the particular pitch link assembly.

Figure 3:
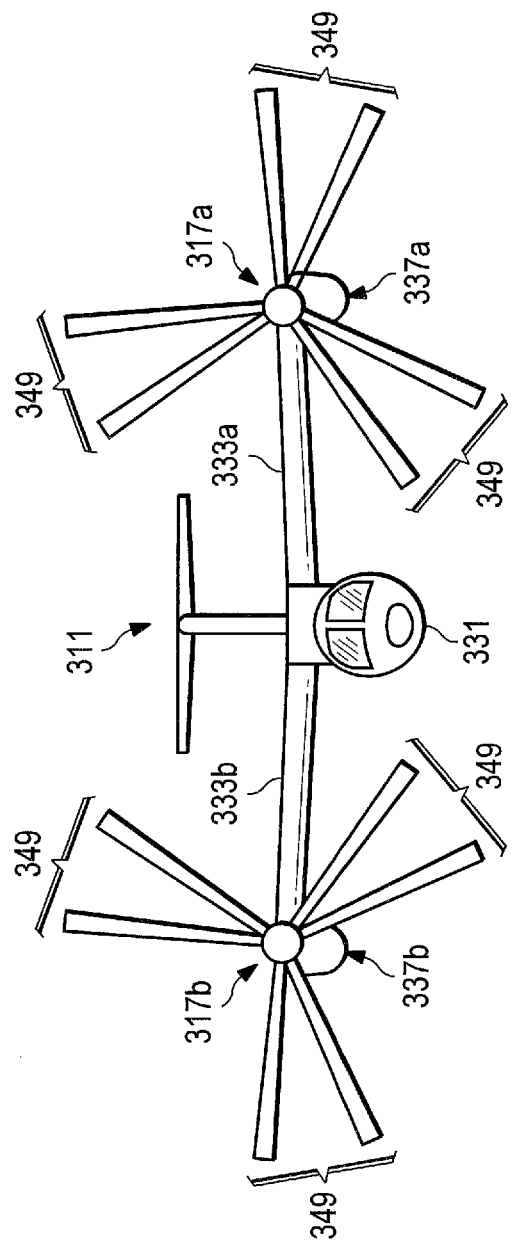
FIG. 3 is a front view of a tiltrotor aircraft, in airplane mode, having a rotor system according the preferred embodiment of the present application.

Referring now to FIG. 3 in the drawings, FIG. 3 is a front view of a rotorcraft 311, while in airplane mode. A first rotor hub 317a is mechanically coupled to a first nacelle 337a and a second rotor hub 317b is couple to a second nacelle 337b. Nacelles 337a and 337b are pivotally attached to wing members 333a and 333b, respectively. Wing members 333a and 333b are rigidly attached to a fuselage 331. Nacelles 337a and 337b are configured to pivotally rotate relative to wing members 333a and 333b between a helicopter mode, in which nacelles 337a and 337b are tilted upward such that rotorcraft 311 flies similar to a conventional helicopter; and an airplane mode in which nacelles 337a and 337b are tilted forward such that rotorcraft 311 flies similar to a conventional propeller-driven airplane. FIG. 3 further depicts the preferred embodiment having three rotor blade pairs 349 on each rotor hub 317a and 317b.

Figure 4:
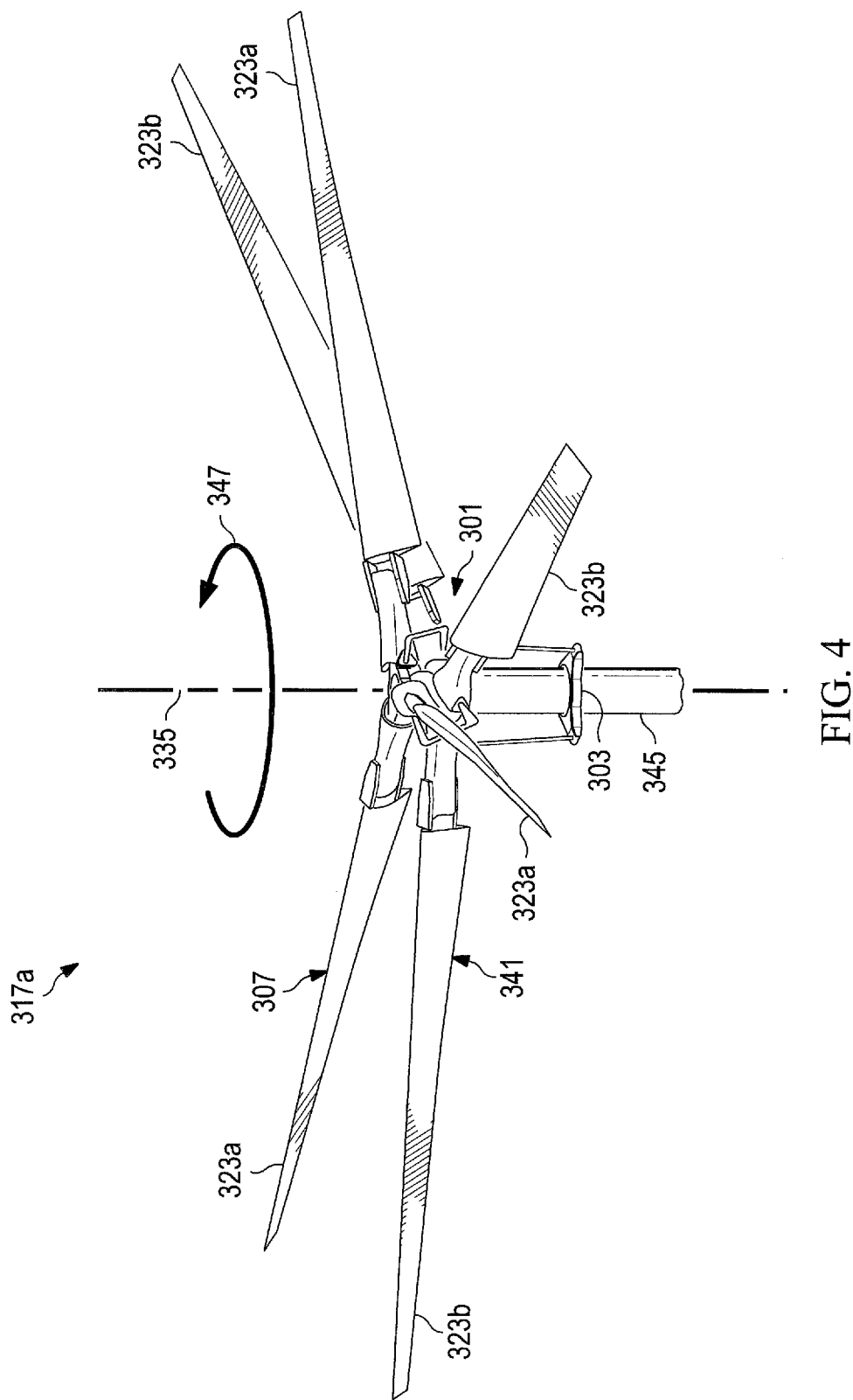
FIG. 4 is a perspective view of the rotor system from the aircraft in FIG. 3, according to the preferred embodiment of the present application.

FIG. 4 in the drawings is a perspective view of rotor hub 317a from rotorcraft 311, while in helicopter mode. A differential pitch link assembly 301 is coupled to a swashplate 303. An upper rotor yoke 309 and a lower rotor yoke 319 are coupled to and rotatable by a mast 245 about axis of rotation 335. Pitch settings for each rotor blade pair 349 are controlled independently. As discussed herein, pitch settings of rotor blades 323a and 323b are controlled in tandem for each rotor blade pair 349. Axis of rotation 335 of mast 245 is located at an intersection rotor blade pitch axes 321, shown in FIG. 5. While the preferred embodiment depicts three rotor blade pairs 349 in each rotor hub 317a and 317b, the scope of the present invention is not so limited. Rather, any suitable plurality of rotor blade pairs 349 may be implemented, and the present application contemplates such alternative embodiments.

Figure 5:
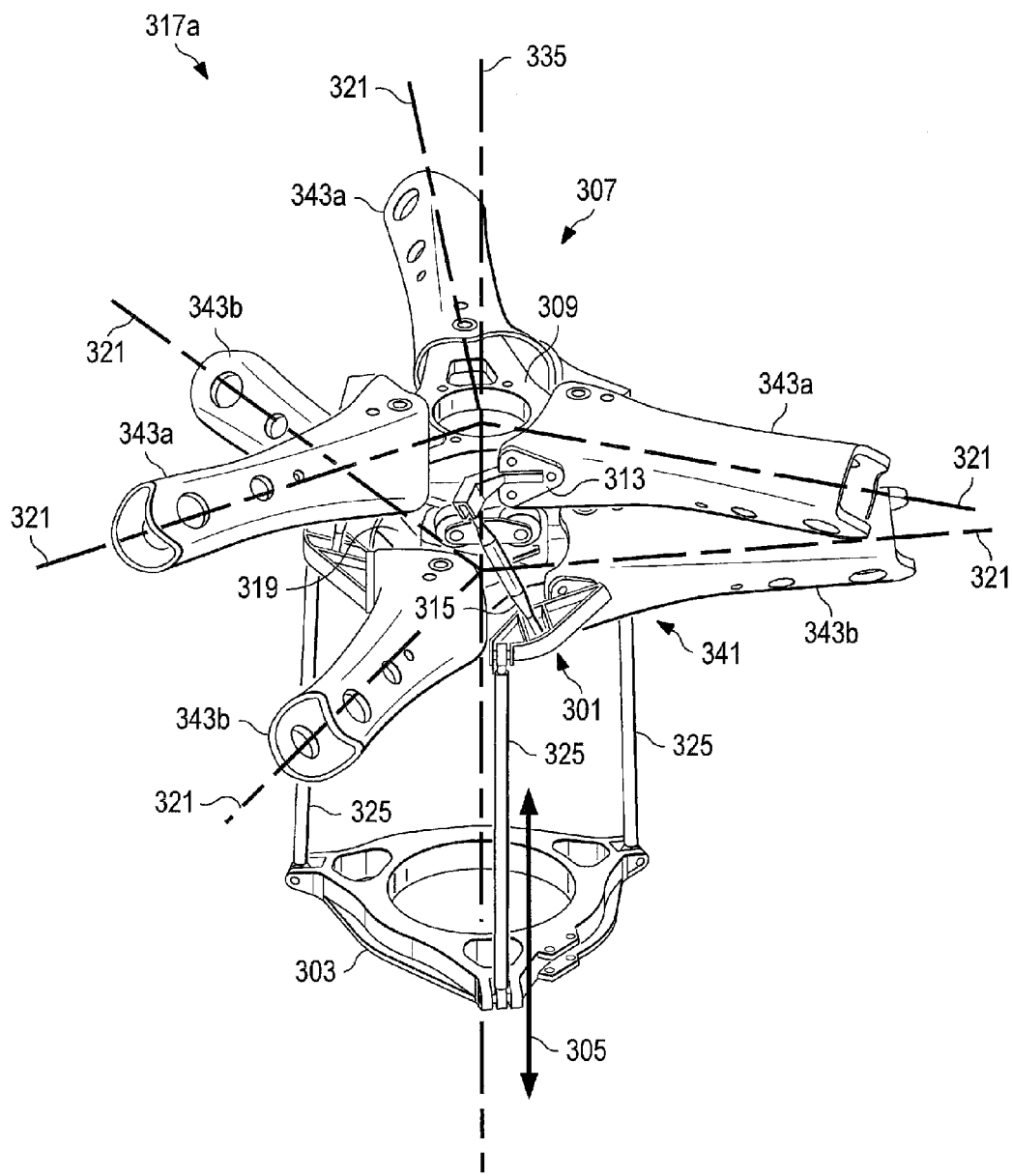
FIG. 5 is a close-up perspective view of the rotor system from the aircraft in FIG. 3, according to the preferred embodiment of the present application.

Now referring to FIG. 5, a more detailed perspective view of rotor hub 317a is illustrated. An upper blade pitch control member 343a is used, in part, to couple upper rotor yoke 309 to upper rotor blade 323a. Similarly, a lower blade pitch control member 343b is used, in part, to couple lower rotor yoke 319 to lower rotor blade 323b. For clarity, FIG. 5 does not illustrate upper rotor blade 323a and lower rotor blade 323b.

Rotor hub 317a has at least one differential pitch link assembly 301 associated with at least one rotor blade pair 349, used to differentially manipulate the pitch of upper rotor blade 323a and lower rotor blade 323b, according to optimum pitch angles. Differential pitch link assembly 301 comprises a swashplate link 325 operably coupled to a lower pitch horn 339, and an upper pitch horn 313 operably coupled to lower pitch horn 339 via an intermediate link 315. Upper pitch horn 313 is operably associated with upper blade pitch control member 343a. Similarly, lower pitch horn 339 is operably associated with lower blade pitch control member 343b. Swashplate 303 is configured to selectively actuate each swashplate link 325 in a swashplate actuation direction 305. In the preferred embodiment, three differential pitch link assemblies 301 are used to control three rotor blade pairs 349; however, it should be appreciated that greater or fewer differential pitch link assemblies 301 may be used in conjunction with a greater or fewer rotor blade pairs 349. Differential pitch link assembly 301 is applicable to rotor systems having an upper rotor disk assembly 307 and a lower rotor disk assembly 341, each disk assembly 307 and 341 configured to be co-axial and co-rotating about an axis of rotation 335.

In the preferred embodiment, upper rotor disk assembly 307 is comprised of three upper blade pitch control members 343a coupled to upper rotor yoke 309. Similarly lower rotor disk assembly 341 is comprised of three lower blade pitch control members 343b coupled to lower rotor yoke 319. Each differential pitch link assembly 301, swashplate 303, upper rotor disk assembly 307, and lower rotor disk assembly 341, are rotatable by a mast 345 about axis of rotation 335.

Figure 6:
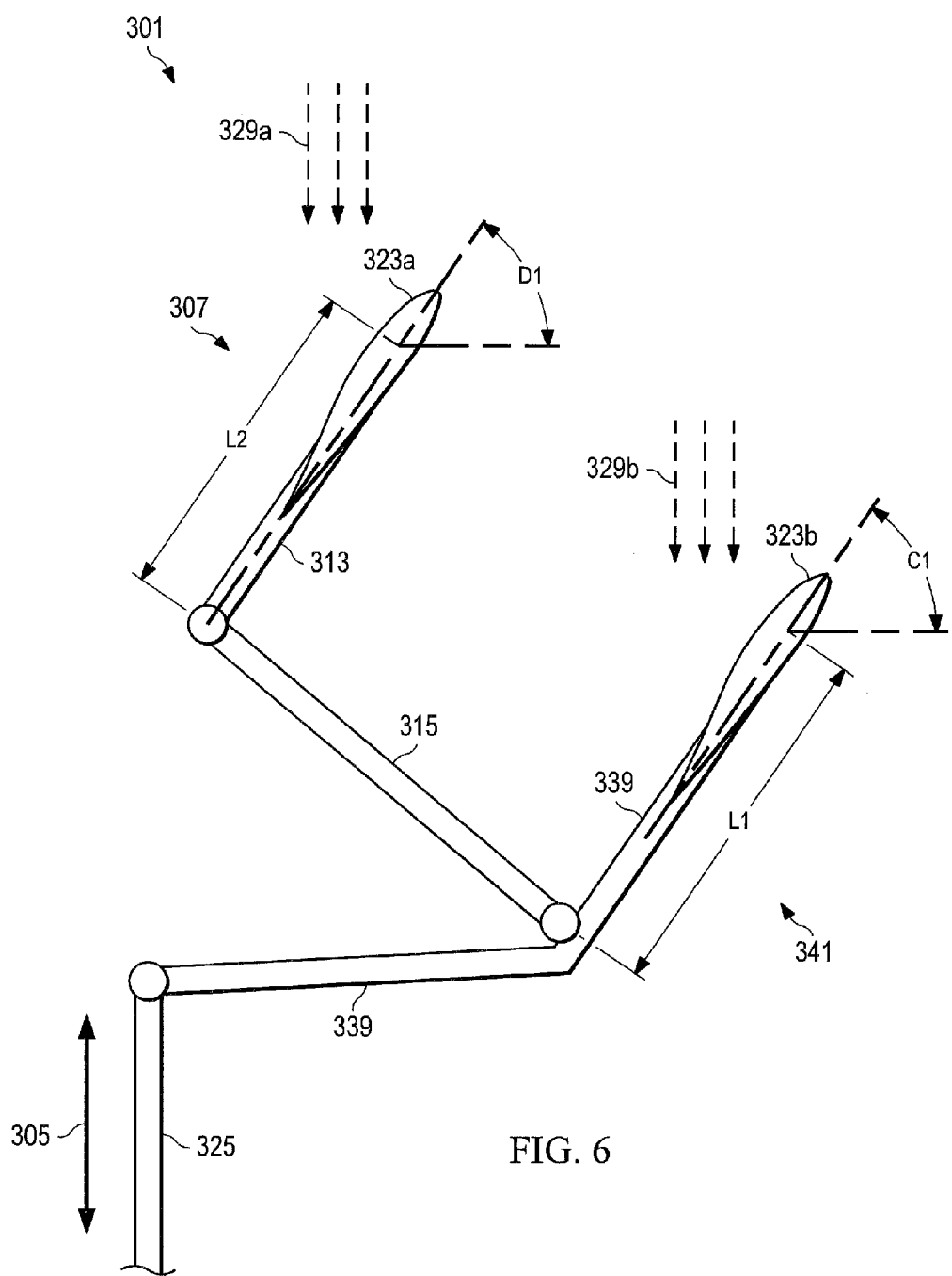
FIG. 6 is a stylized schematic view of the rotor system from the aircraft in FIG. 3, while in airplane mode, according to the preferred embodiment of the present application.

FIG. 6 represents a stylized schematic view of rotor hub 317a in airplane mode. During airplane mode, the upper rotor disk assembly 307 experiences relatively the same air inflow velocity as lower rotor disk assembly 341. Therefore, airplane mode upper air flow 329a and airplane mode lower air flow 329b are approximately the same. As such, during airplane mode, upper rotor disk collective pitch angle D1 is substantially similar to lower rotor disk collective pitch angle C1.

Figure 7:
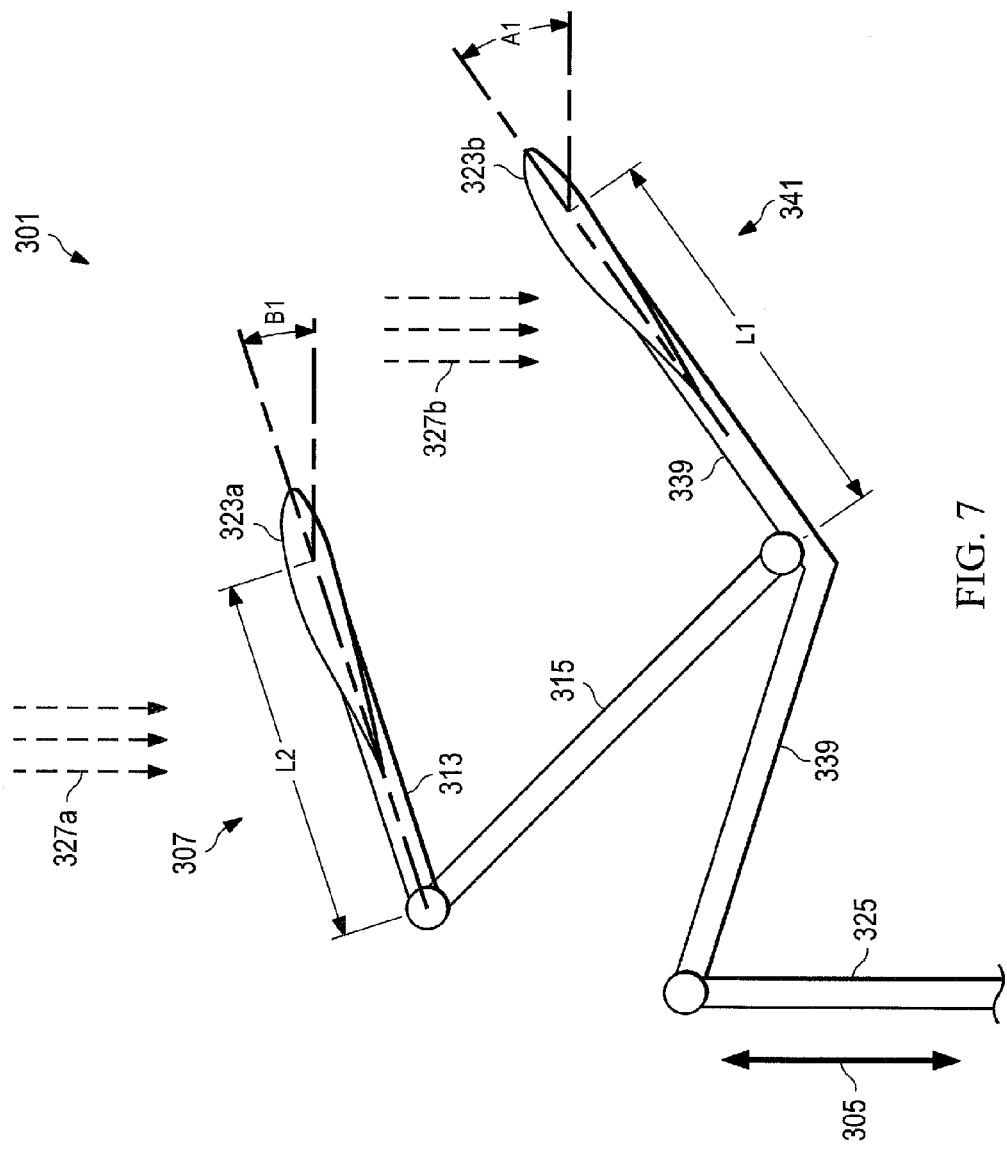
FIG. 7 is a stylized schematic view of the rotor system from the aircraft in FIG. 3, while in helicopter mode, according to the preferred embodiment of the present application.

FIG. 7 represents a stylized schematic view of rotor hub 317a in helicopter mode. During helicopter mode, upper rotor disk assembly 307 accelerates air towards lower rotor disk assembly 341. As such, lower rotor disk assembly 341 experiences a higher air inflow velocity than experienced by upper rotor disk assembly 307. Helicopter mode lower air flow 327b is significantly higher than helicopter mode upper air flow 327a. In order to provide optimal performance, a lower disk collective pitch angle A1 is higher than an upper disk collective pitch angle B1 so as to accommodate the difference the velocities of air flow 327a and air flow 327b. In order to achieve optimal disk angles while using the same swashplate link 325 to control both upper and lower pitch horns 313 and 339; an operable pitch horn length L1 is longer than an operable pitch horn length L2. Because operable pitch horn length L1 is longer than L2, actuation of swashplate link 325 changes the upper rotor disk collective pitch angle B1 more severely than lower rotor disk collective pitch angle A1. When converting from airplane mode to helicopter mode, swashplate link 325 is actuated up towards upper and lower rotor disk assemblies 307 and 341.

Upper blade pitch control member 343a is used, in part, to couple upper rotor yoke 309 to upper rotor blade 323a. Similarly, lower blade pitch control member 343b is used, in part, to couple lower rotor yoke 319 to lower rotor blade 323b. Each of rotor blade pair 349 comprises upper rotor blade 323a and lower rotor blade 323b. Each rotor blade 323a and 323b comprises an airfoil shape capable of producing lift when air is moved over the airfoil shape. As such, the amount of lift can be controlled by adjusting the pitch of upper rotor blade 323a and lower rotor blade 323b, in tandem with an associated differential pitch link assembly 301. Upper rotor yoke 309 and lower rotor yoke 319 are located in two different planes along axis of rotation 335. As such, upper rotor blade 323a and lower rotor blade 323b operate approximately in the separate spatial planes as defined by the location of upper rotor yoke 309 and lower rotor yoke 319, respectively. Upper rotor yoke 309 and lower rotor yoke 319 are clocked by an angle A, about axis of rotation 335; as such, upper rotor blade 323a and lower rotor blade 323b are positioned about the same angle A. In the preferred embodiment, Angle A is approximately 30 degrees; however, Angle A may also be other angles depending on design factors; such as, number of rotor blade pairs 349 and size of rotor blades 323a and 323b.

FIG. 3 depicts the preferred embodiment of a rotorcraft 311 incorporating two rotor hubs 317a and 317b, and a plurality of rotor blade pairs 349, operably associated with each rotor hub 317a and 317b. Masts 345 (one shown in FIG. 4) extend from a transmission (not shown) within each nacelle 337a and 337b of rotorcraft 311. It should be noted that, while rotorcraft 311 is depicted in FIG. 3 as being a tiltrotor aircraft, the scope of the present invention is not so limited. Rather, the system of the present application contemplates rotorcraft 311 being any type of rotorcraft, such as a helicopter, a tandem rotor helicopter, a tiltrotor aircraft, a four-rotor tiltrotor aircraft, a tilt wing aircraft, or a tail sitter aircraft.

The system of the present application provides significant advantages, including: (1) providing a way to efficiently control the pitch of multiple rotor blades according to optimum pitch angles during a helicopter mode and an airplane mode; (2) providing a way to utilize a plurality rotor blades in a rotorcraft without the added control mechanism weight found in conventional rotorcraft; (3) providing a way to utilize a plurality rotor blades in a rotorcraft while keeping the rotor hub size as small as possible.

It is apparent that a system with significant advantages has been described and illustrated. Although the system of the present application is shown in a limited number of forms, it is not limited to just these forms, but is amenable to various changes and modifications without departing from the spirit thereof.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A rotor system for a rotorcraft, comprising:
    a rotor blade pair comprising an upper rotor blade and a lower rotor blade;
    a differential pitch assembly operably associated with the rotor blade pair for controlling a pitch angle of the upper rotor blade and the lower rotor blade, the differential pitch assembly comprising:
    a swashplate link coupled between a swashplate and a lower pitch horn;
    an intermediate link coupled between an upper pitch horn and the lower pitch horn;
    wherein the upper rotor blade is coupled to the upper pitch horn;
    wherein the lower rotor blade is coupled to the lower pitch horn;
    whereby actuation of the swashplate link changes the pitch of both the upper rotor blade and the lower rotor blade;
    wherein the upper rotor blade and the lower rotor blade both rotate in a single direction and about a same axis of rotation;
    wherein the upper rotor blade and the lower rotor blade are configured to provide a propulsive force upon the aircraft;
    whereby actuation of the swashplate link changes the pitch of the upper rotor blade more severely than the pitch of the lower rotor blade.

2. The rotor system according to claim 1, wherein the lower pitch horn is longer than the upper pitch horn.

3. The rotor system according to claim 1, wherein the propulsive force is a lifting force.

4. The rotor system according to claim 1, wherein the propulsive force is a thrusting force.

5. A rotorcraft, comprising:
    a fuselage;
    a wing member;
    a rotor blade pair comprising an upper rotor blade and a lower rotor blade;
    a differential pitch assembly operably associated with the rotor blade pair for controlling a pitch angle of the upper rotor blade and the lower rotor blade, the differential pitch assembly comprising:
    a swashplate link coupled between a swashplate and a lower pitch horn;
    an intermediate link coupled between an upper pitch horn and the lower pitch horn;
    wherein the upper rotor blade is coupled to the upper pitch horn; wherein the lower rotor blade is coupled to the lower pitch horn;
    whereby actuation of the swashplate link changes the pitch of both the upper rotor blade and the lower rotor blade;
    wherein the upper rotor blade and the lower rotor blade both rotate in a single direction and about a same axis of rotation;
    wherein the upper rotor blade and the lower rotor blade are configured to provide a propulsive force upon the aircraft;
    whereby actuation of the swashplate link changes the pitch of the upper rotor blade more severely than the pitch of the lower rotor blade.

6. The rotorcraft according to claim 5, wherein the lower pitch horn is longer than the upper pitch horn.

7. The rotorcraft according to claim 5, wherein the propulsive force is a lifting force.

8. The rotorcraft according to claim 5, wherein the propulsive force is a thrusting force.

* * * * *